(12) United States Patent
Chen et al.

(10) Patent No.: US 10,692,193 B2
(45) Date of Patent: Jun. 23, 2020

(54) SATURATION ENHANCEMENT METHOD AND DEVICE BASED ON FUZZY CONTROL

(71) Applicant: SHENZHEN CHINA STAR OPTOELECTRONICS SEMICONDUCTOR DISPLAY TECHNOLOGY CO., LTD., Shenzhen, Guangdong (CN)

(72) Inventors: Yunna Chen, Guangdong (CN); Shensian Syu, Guangdong (CN)

(73) Assignee: SHENZHEN CHINA STAR OPTOELECTRONICS SEMICONDUCTOR DISPLAY TECHNOLOGY CO., LTD., Shenzhen, Guangdong (CN)

( * ) Notice: Subject to any disclaimer, the term of this patent is extended or adjusted under 35 U.S.C. 154(b) by 117 days.

(21) Appl. No.: 16/088,754

(22) PCT Filed: Sep. 6, 2018

(86) PCT No.: PCT/CN2018/104451
§ 371 (c)(1),
(2) Date: Sep. 26, 2018

(87) PCT Pub. No.: WO2019/179059
PCT Pub. Date: Sep. 26, 2019

(65) Prior Publication Data
US 2019/0370945 A1   Dec. 5, 2019

(30) Foreign Application Priority Data

Mar. 23, 2018 (CN) .......................... 2018 1 0247968

(51) Int. Cl.
*G06T 5/00* (2006.01)
*H04N 1/60* (2006.01)

(52) U.S. Cl.
CPC .......... *G06T 5/007* (2013.01); *H04N 1/6027* (2013.01); *G06T 2207/10004* (2013.01)

(58) Field of Classification Search
CPC .......... G06T 5/007; G06T 2207/10004; H04N 1/6027

(Continued)

(56) References Cited

U.S. PATENT DOCUMENTS

2008/0298688 A1* 12/2008 Cheong .................... G06K 7/14
                                                              382/224
2013/0329998 A1   12/2013 Webb et al.
2017/0323481 A1* 11/2017 Tran ....................... G06T 19/006

FOREIGN PATENT DOCUMENTS

CN        101790101 A      7/2010
CN        102779330 A     11/2012
(Continued)

*Primary Examiner* — Congvan Tran
(74) *Attorney, Agent, or Firm* — Leong C. Lei (57) ABSTRACT

The invention provides a saturation enhancement method and device based on fuzzy control. The saturation control method based on fuzzy control utilizes a fuzzy system to output an enhancement weight according to the saturation component, value component and detail information or saturation component, intensity component, and detail information of an input image, and feeds back the enhancement weight to the enhancement function, to change the enhancement intensity of the saturation component. As such, the color uncertainty caused by saturation enhancement can be avoided, and the loss of detail information in saturation enhancement can be reduced.

11 Claims, 7 Drawing Sheets

(58) Field of Classification Search
USPC .......................................................... 382/274
See application file for complete search history.

(56) References Cited

FOREIGN PATENT DOCUMENTS

| | | |
|---|---|---|
| CN | 107529050 A | 12/2017 |
| CN | 108495109 A | 9/2018 |

* cited by examiner

SATURATION ENHANCEMENT METHOD AND DEVICE BASED ON FUZZY CONTROL

RELATED APPLICATIONS

The present application is a National Phase of International Application Number PCT/CN2018/104451, filed Sep. 6, 2018, and claims the priority of China Application No. 201810247968.2, filed Mar. 23, 2018.

BACKGROUND OF THE INVENTION

1. Field of the Invention

The present invention relates to the field of display techniques, and in particular to a saturation enhancement method and device based on fuzzy control.

2. The Related Arts

With the development of display technology, the flat display devices such as liquid crystal displays (LCD) devices and organic light emitting diode (OLED) display devices, provide the advantages of high image quality, power saving, thinness and wide application range, and are widely used in mobile phones, televisions, personal digital assistants, digital cameras, notebook computers, desktop computers and other consumer electronics products, and become the mainstream in the display device.

Enhancing the visual effects of the images and the quality of the images are the main topics of image processing. With the development of display technologies, users have higher and higher demands on the quality of display images. As the bright colors provide the users with better visual experience, more and more display devices have included image color enhancement function.

At present, two common image color enhancement methods are used. The first type of enhancement method does not perform space conversion, but directly performs the same scaling and translation on the red (R), green (G), and (B) components in the image in the RGB color space, to achieve the purpose of the unchanged color tone. The second type of enhancement method is to convert the color components from the RGB space to other spaces, for example, the HSV color space formed by hue (H), saturation (S) and value (V) or HSI color space formed by hue, saturation and intensity (I), performs the appropriate computation and then converts back to the RGB space.

In the above second type of enhancement method, to ensure that the hue is not changed after the image is enhanced, a saturation function curve is generally selected to control the change of the saturation component during the computation processing. However, this method usually loses image details, and saturation enhancement is not recommended for regions close to low saturation because the hue in the low saturation region is uncertain and may produce undesirable colors after enhancement.

SUMMARY OF THE INVENTION

The object of the present invention is to provide a saturation enhancement method based on fuzzy control, able to avoid the color uncertainly caused by saturation enhancement and reduce the loss of detailed information in saturation enhancement.

Another object of the present invention is to provide a saturation enhancement device based on fuzzy control, able to avoid the color uncertainly caused by saturation enhancement and reduce the loss of detailed information in saturation enhancement.

To achieve the above object, the present invention provides a saturation enhancement method based on fuzzy control, which comprises the following steps of:

Step S1: converting an input image from RGB color space to HSV color space consisting of hue component, saturation component and value component or HSI color space consisting of hue component, saturation component and intensity component;

Step S2: performing edge detection on the input image based on the saturation component to obtain detail information of the input image;

Step S3: providing a fuzzy system to input the saturation component, value component and detail information or saturation component, intensity component and detail information of the input image into the fuzzy system;

Step S4: the fuzzy system outputting an enhancement weight according to the inputted saturation component, value component and detail information or saturation component, intensity component, and detail information;

Step S5: according to the enhancement weight and a preset enhancement function, enhancing the saturation component to obtain an enhanced saturation component;

Step S6: converting the hue component, the enhanced saturation component, and the value component or hue component, the enhanced saturation component, and the intensity component back to the RGB color space to obtain a saturation-enhanced image.

According to a preferred embodiment of the present invention, in step S3, the step of providing a fuzzy system specifically comprises:

setting a membership function for the saturation component, a membership function for the value or intensity component, a membership function for the detail information, and a membership function for the enhancement weight in the fuzzy system; and defining rule base of the fuzzy system.

According to a preferred embodiment of the present invention, in step S2, the input image is edge-detected and normalized through a Sobel template to obtain detail information of the input image.

According to a preferred embodiment of the present invention, optionally, the preset enhancement function in step S5 is:

$$fS = S^R;$$

wherein S is original saturation component of the input image, fS is enhanced saturation component of the input image, $R = R1 \times FuzzyWeight$, R1 is a preset enhancement index, FuzzyWeight is an enhancement weight, $R1 < 0$.

According to a preferred embodiment of the present invention, optionally, the preset enhancement function in step S5 is:

$$fS = FuzzyWeight \times fS1 + (1 - FuzzyWeight) fS2;$$

wherein fS is the enhanced saturation component of the input image, FuzzyWeight is an enhancement weight, fS1 is a first saturation component obtained from a preset first function and original saturation component of the input image, fS2 is a second saturation component obtained from a preset second function and the original saturation component of the input image, $fS1 > fS2$; the preset first function is a segment transformation function, and the preset second function is a linear mapping function.

The present invention further provides a saturation enhancement device based on fuzzy control, which comprises: a transformation unit, a detection unit connected with the transformation unit, a fuzzy system connected with the transformation unit and the detection unit, an enhancement unit connected with the transformation unit and the fuzzy system, and a recovery unit connected with the enhancement unit and the transformation unit;

wherein the transform unit being configured to convert an input image from RGB color space to an HSV color space consisting of a hue component, a saturation component, and a value component or an HSI color space consisting of a hue component, a saturation component, and an intensity component;

the detection unit being configured to perform edge detection on the input image according to the saturation component to obtain detail information of the input image;

the fuzzy system being used to output an enhancement weight according to the inputted saturation component, value component and detail information or saturation component, intensity component, and detail information;

the enhancement unit being configured to enhance the saturation component according to the enhancement weight and a preset enhancement function to obtain an enhanced saturation component;

the recovery unit being configured to convert the hue component, the enhanced saturation component and the value component or the hue component, the enhanced saturation component, and the intensity component back to the RGB color space to obtain a saturation-enhanced image.

According to a preferred embodiment of the present invention, the fuzzy system comprises: a membership function for the saturation component, a membership function for the value or intensity component, a membership function for the detail information, a membership function for the enhancement weight and rule base of the fuzzy system.

According to a preferred embodiment of the present invention, the detection unit uses a Sobel template to perform edge detection and normalization on the input image to obtain the detail information of the input image.

According to a preferred embodiment of the present invention, optionally, the preset enhancement function is:

$$fS=S^R;$$

wherein S is original saturation component of the input image, fS is enhanced saturation component of the input image, R=R1×FuzzyWeight, R1 is a preset enhancement index, FuzzyWeight is an enhancement weight, R1<0.

According to a preferred embodiment of the present invention, optionally, the preset enhancement function is:

$$fS=FuzzyWeight \times fS1+(1-FuzzyWeight)fS2;$$

wherein fS is the enhanced saturation component of the input image, FuzzyWeight is an enhancement weight, fS1 is a first saturation component obtained from a preset first function and original saturation component of the input image, fS2 is a second saturation component obtained from a preset second function and the original saturation component of the input image, fS1>fS2; the preset first function is a segment transformation function, and the preset second function is a linear mapping function.

The present invention also provides a saturation enhancement method based on fuzzy control, which comprises the following steps of:

Step S1: converting an input image from RGB color space to HSV color space consisting of hue component, saturation component and value component or HSI color space consisting of hue component, saturation component and intensity component;

Step S2: performing edge detection on the input image based on the saturation component to obtain detail information of the input image;

Step S3: providing a fuzzy system to input the saturation component, value component and detail information or saturation component, intensity component and detail information of the input image into the fuzzy system;

Step S4: the fuzzy system outputting an enhancement weight according to the inputted saturation component, value component and detail information or saturation component, intensity component, and detail information;

Step S5: according to the enhancement weight and a preset enhancement function, enhancing the saturation component to obtain an enhanced saturation component;

Step S6: converting the hue component, the enhanced saturation component, and the value component or hue component, the enhanced saturation component, and the intensity component back to the RGB color space to obtain a saturation-enhanced image.

wherein, in step S3, the step of providing a fuzzy system specifically comprising:

setting a membership function for the saturation component, a membership function for the value or intensity component, a membership function for the detail information, and a membership function for the enhancement weight in the fuzzy system; and defining rule base of the fuzzy system;

wherein, in step S2, the input image being edge-detected and normalized through a Sobel template to obtain detail information of the input image;

wherein the preset enhancement function in step S5 being:

$$fS=S^R;$$

wherein S being original saturation component of the input image, fS being enhanced saturation component of the input image, R=R1×FuzzyWeight, R1 being a preset enhancement index, FuzzyWeight being an enhancement weight, R1<0.

The present invention provides the following advantages. The present invention provides a saturation enhancement method based on fuzzy control, and the saturation enhancement method based on fuzzy control utilizes a fuzzy system to output an enhancement weight according to the saturation component, value component and detail information or saturation component, intensity component, and detail information of an input image, and feeds back the enhancement weight to the enhancement function to change the saturation intensity of the saturation component, so that the color uncertainty caused by saturation enhancement can be avoided, and the loss of detail information in saturation enhancement can be reduced. The present invention also provides a saturation enhancement device based on fuzzy control, which can avoid the color uncertainty caused by saturation enhancement and reduce the loss of detail information in saturation enhancement.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

To further explain the technique means and effect of the present invention, the following uses preferred embodiments and drawings for detailed description.

Figure 1:
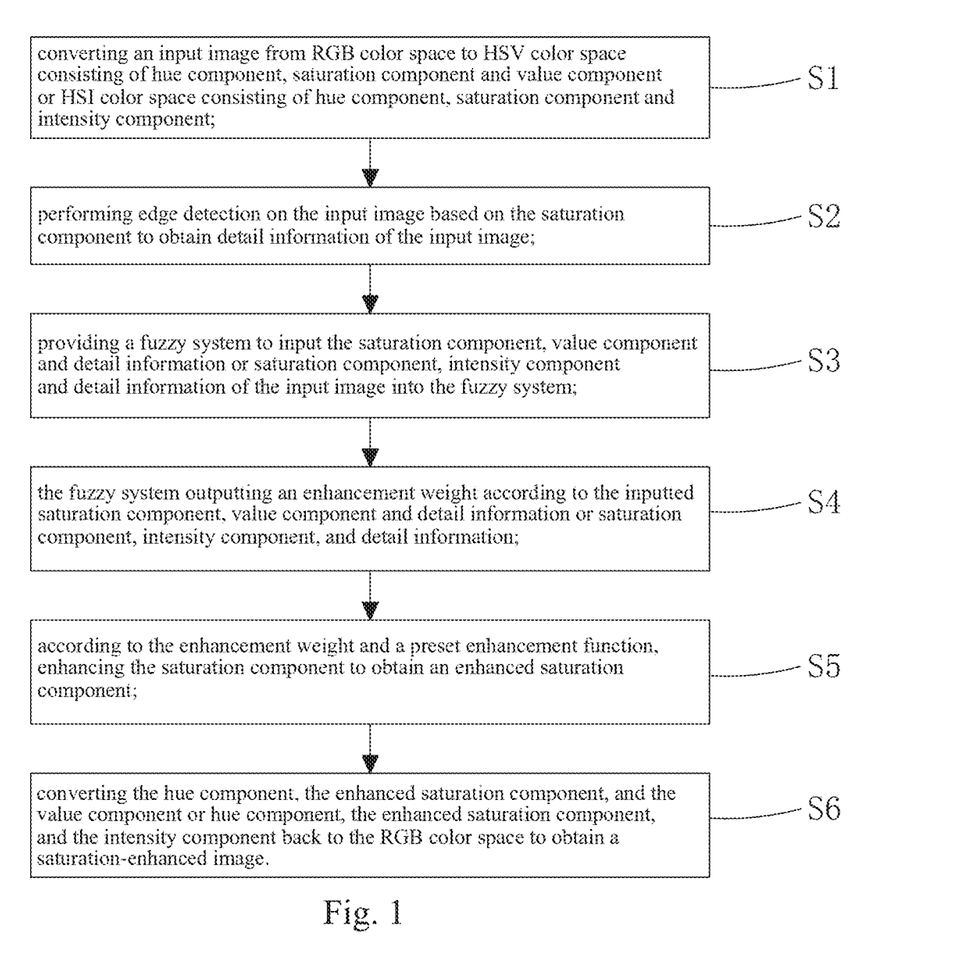
FIG. 1 is a schematic view showing the flowchart of the saturation enhancement method based on fuzzy control provided by the embodiment of the present invention.

Referring to FIG. 1, the present invention provides a saturation enhancement method based on fuzzy control, which comprises the following steps of:

Step S1: converting an input image from RGB color space to HSV color space consisting of hue component, saturation component and value component or HSI color space consisting of hue component, saturation component and intensity component.

Specifically, the process of converting the input image from the RGB color space to the HSV color space or the HSI color space in step S1 is completed by adopting the known conversion formula, which will not be described here.

Step S2: performing edge detection on the input image based on the saturation component to obtain detail information of the input image.

Optionally, in some embodiments of the present invention, in step S2, the input image is edge-detected and normalized through a Sobel template to obtain detail information of the input image. Without limiting the scope of the present invention, the edge detection can also be performed by using other methods.

Step S3: providing a fuzzy system to input the saturation component, value component and detail information or saturation component, intensity component and detail information of the input image into the fuzzy system.

Specifically, in step S3, the step of providing a fuzzy system specifically comprises:

setting a membership function for the saturation component, a membership function for the value or intensity component, a membership function for the detail information, and a membership function for the enhancement weight in the fuzzy system; and defining rule base of the fuzzy system.

Step S4: the fuzzy system outputting an enhancement weight according to the inputted saturation component, value component and detail information or saturation component, intensity component, and detail information.

Specifically, the saturation enhancement intensity increases as the enhancement weight increases, and the enhancement weight ranges from 0 to 1.

Optionally, in some embodiments of the present invention, the membership function for the saturation component, the membership function for the value or intensity component, the membership function for the detail information, and the membership function for the enhancement weight are shown in FIG. 3, FIG. 4, FIG. 5, and FIG. 6, respectively. The rule base of the fuzzy system is shown in Table 1.

TABLE 1

| Serial Number | Value/ Intensity | Saturation | Detail Information | Enhancement Weight |
|---|---|---|---|---|
| 1 | mf11 | mf21 | mf31 | mf41 |
| 2 | mf11 | mf21 | mf32 | mf41 |
| 3 | mf11 | mf21 | mf33 | mf41 |
| 4 | mf11 | mf22 | mf31 | mf44 |
| 5 | mf11 | mf22 | mf32 | mf43 |
| 6 | mf11 | mf22 | mf33 | mf42 |
| 7 | mf11 | mf23 | mf31 | mf45 |
| 8 | mf11 | mf23 | mf32 | mf44 |
| 9 | mf11 | mf23 | mf33 | mf43 |
| 10 | mf12 | mf21 | mf31 | mf42 |
| 11 | mf12 | mf21 | mf32 | mf42 |
| 12 | mf12 | mf21 | mf33 | mf42 |
| 13 | mf12 | mf22 | mf31 | mf45 |
| 14 | mf12 | mf22 | mf32 | mf44 |
| 15 | mf12 | mf22 | mf33 | mf43 |
| 16 | mf12 | mf23 | mf31 | mf45 |
| 17 | mf12 | mf23 | mf32 | mf44 |
| 18 | mf12 | mf23 | mf33 | mf43 |
| 19 | mf13 | mf21 | mf31 | mf41 |
| 20 | mf13 | mf21 | mf32 | mf41 |
| 21 | mf13 | mf21 | mf33 | mf41 |
| 22 | mf13 | mf22 | mf31 | mf44 |
| 23 | mf13 | mf22 | mf32 | mf43 |
| 24 | mf13 | mf22 | mf33 | mf42 |
| 25 | mf13 | mf23 | mf31 | mf45 |
| 26 | mf13 | mf23 | mf32 | mf44 |
| 27 | mf13 | mf23 | mf33 | mf43 |

As shown in Table 1, when the saturation is low (saturation is mf21), the enhancement weight is low (mf41) or lower (mf42) regardless of whether the detail information is transformed or not; that is, when the saturation is low, the saturation enhancement intensity is very low to avoid the hue uncertainty, and when the saturation is medium or high (mf22 or mf23), the enhancement weight will decrease as the detail information increases; that is, when the saturation is moderate or high, to reduce the loss of detail information, the more detailed information is, the lower the saturation enhancement intensity will be.

Step S5: according to the enhancement weight and a preset enhancement function, enhancing the saturation component to obtain an enhanced saturation component.

Optionally, the preset enhancement function in step S5 is:

$$fS = S^R;$$

wherein S is original saturation component of the input image, fS is enhanced saturation component of the input image, R=R1×FuzzyWeight, R1 is a preset enhancement index, FuzzyWeight is an enhancement weight, R1<0.

Optionally, the preset enhancement function in step S5 is:

$$fS = \text{FuzzyWeight} \times fS1 + (1 - \text{FuzzyWeight}) fS2;$$

wherein fS is the enhanced saturation component of the input image, FuzzyWeight is an enhancement weight, fS1 is a first saturation component obtained from a preset first function and original saturation component of the input image, fS2 is a second saturation component obtained from a preset second function and the original saturation component of the input image, fS1>fS2; the preset first function is a segment transformation function, and the preset second function is a linear mapping function.

Figure 7:
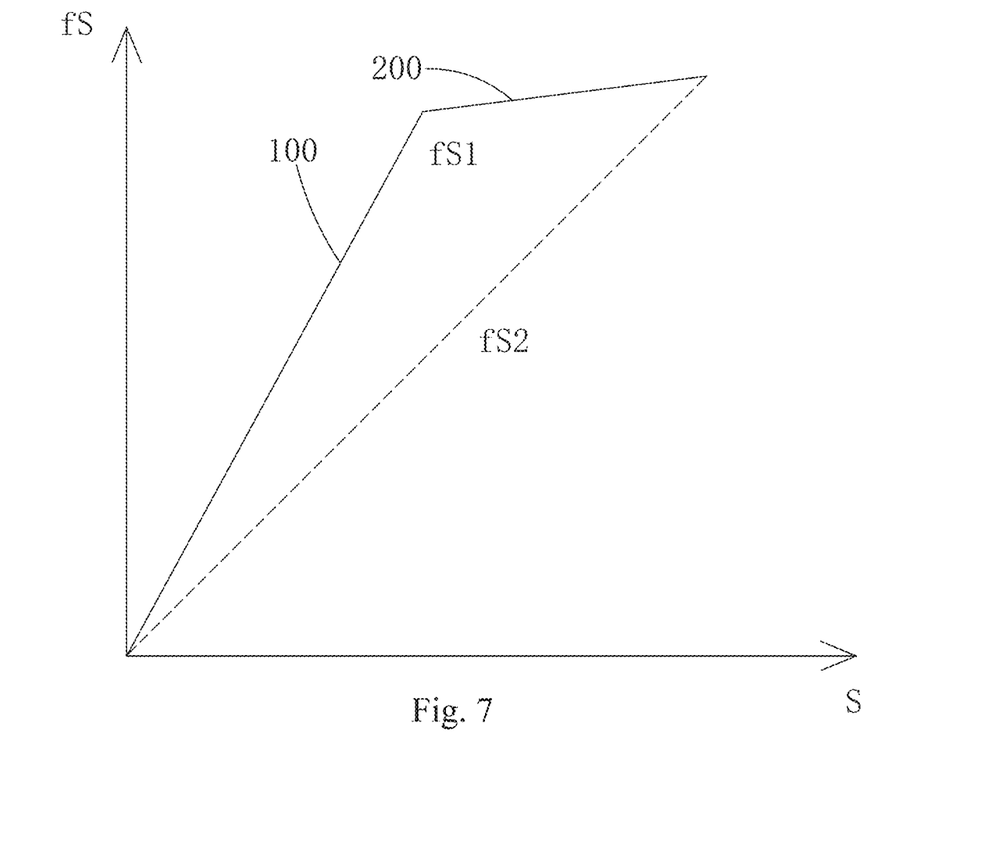
FIG. 7 is a schematic view showing the enhancement function of the saturation enhancement method based on fuzzy control provided by the embodiment of the present invention.

Optionally, as shown in FIG. 7, the preset first function is a segment transformation function, the preset second function is a linear mapping function, the preset first function is shown by the solid line in the FIG. 7, and the preset second function is shown by the dotted line in FIG. 7. The preset first function comprises the first transformation segment 100 and the second transformation segment 200. Under the same original saturation, the first saturation component is always greater than the second saturation component. The larger the enhancement weight is, the closer the enhanced saturation component is to the first saturation component; that is, the larger the enhancement weight is, the greater the enhancement intensity is. Accordingly, the smaller the enhancement weight is, the closer the enhanced saturation component is to the second saturation component. In other words, the smaller the enhancement weight is, the smaller the enhancement intensity is.

Step S6: converting the hue component, the enhanced saturation component, and the value component or hue component, the enhanced saturation component, and the intensity component back to the RGB color space to obtain a saturation-enhanced image.

Specifically, the process of converting the hue component, enhanced saturation component and value component or hue component, enhanced saturation component and intensity component back to the RGB color space is completed by adopting the known conversion technique, which will not be described here.

Figure 2:
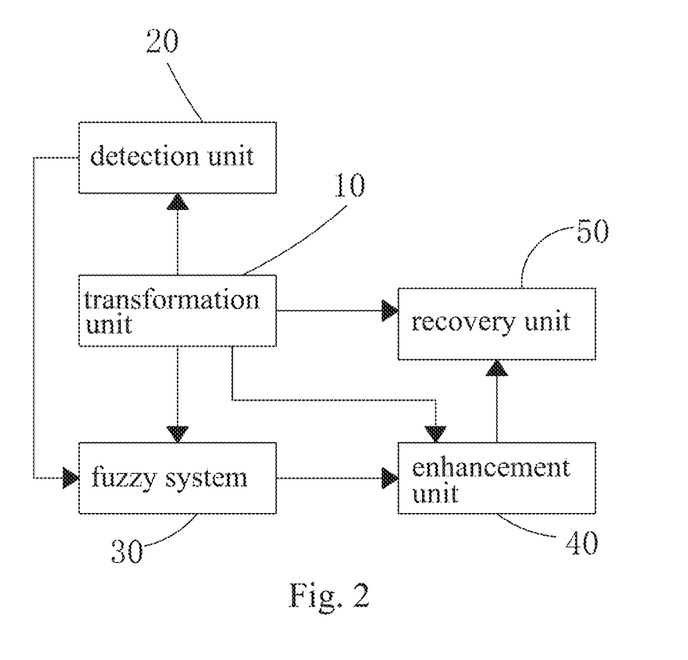
FIG. 2 is a schematic view showing the structure of the saturation enhancement device based on fuzzy control provided by the embodiment of the present invention.
Figure 3:
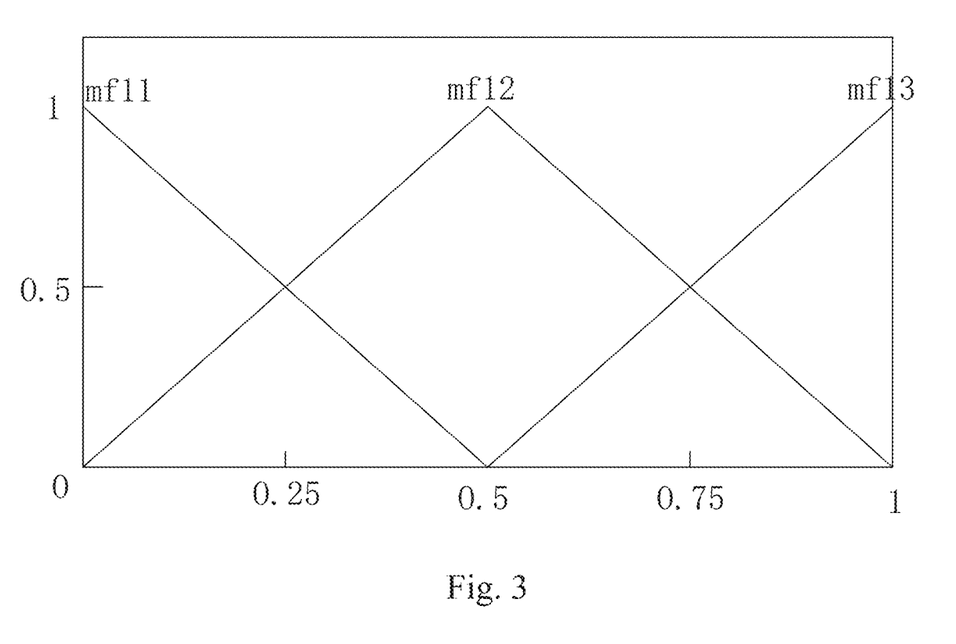
FIG. 3 is a schematic view showing the membership function for value component or intensity component in the fuzzy system of the saturation enhancement device based on fuzzy control provided by the embodiment of the present invention.
Figure 4:
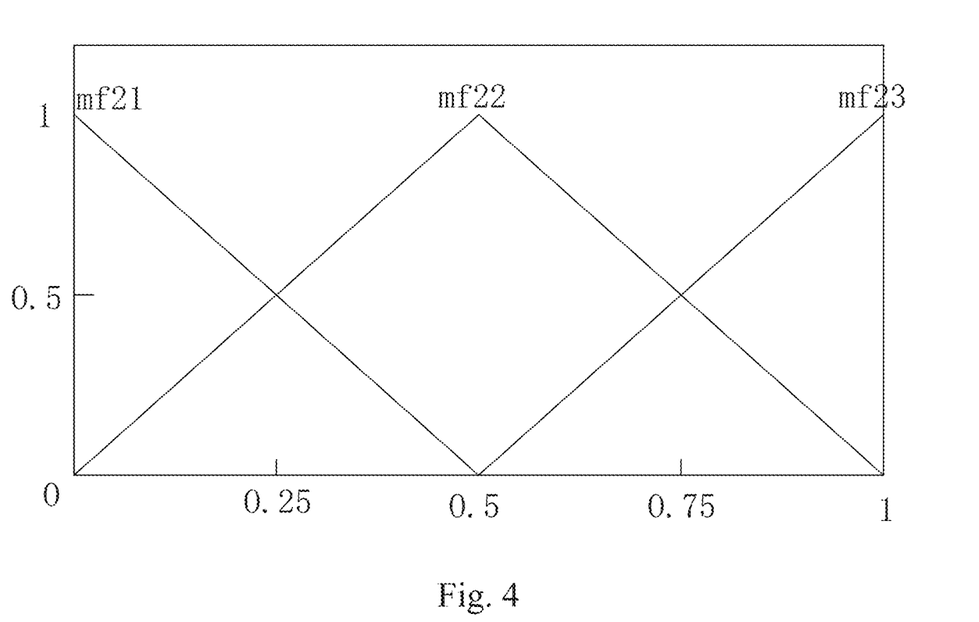
FIG. 4 is a schematic view showing the membership function for saturation component in the fuzzy system of the saturation enhancement device based on fuzzy control provided by the embodiment of the present invention.
Figure 5:
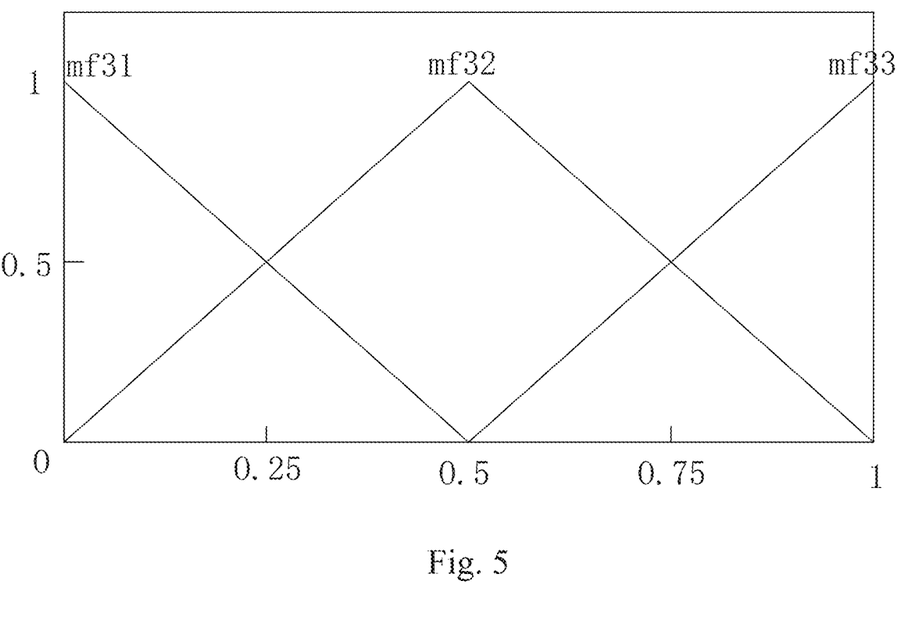
FIG. 5 is a schematic view showing the membership function for detail information in the fuzzy system of the saturation enhancement device based on fuzzy control provided by the embodiment of the present invention.
Figure 6:
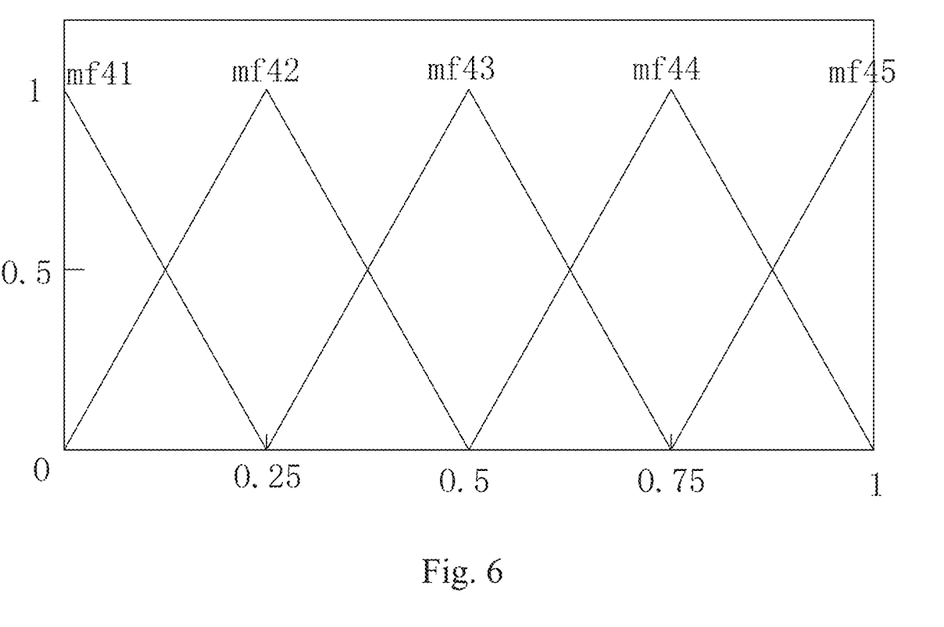
FIG. 6 is a schematic view showing the membership function for enhancement weight in the fuzzy system of the saturation enhancement device based on fuzzy control provided by the embodiment of the present invention.

Refer to FIG. 2. The present invention further provides saturation enhancement device based on fuzzy control, which comprises: a transformation unit 10, a detection unit 20 connected with the transformation unit 10, a fuzzy system 30 connected with the transformation unit 10 and the detection unit 20, an enhancement unit 40 connected with the transformation unit 10 and the fuzzy system 30, and a recovery unit 50 connected with the enhancement unit 40 and the transformation unit 10.

Specifically, the transform unit 10 is configured to convert an input image from RGB color space to an HSV color space consisting of a hue component, a saturation component, and a value component or an HSI color space consisting of a hue component, a saturation component, and an intensity component. Specifically, the conversion of the input image from the RGB color space to the HSV color space or the HSI color space is completed by adopting the known conversion formula, which will not be described here.

Specifically, the detection unit 20 is configured to perform edge detection on the input image according to the saturation component to obtain detail information of the input image.

Optionally, in some embodiments of the present invention, the detection unit 20 uses a Sobel template to perform edge detection and normalization on the input image to obtain the detail information of the input image. Without limiting the scope of the present invention, the edge detection can also be performed by using other methods.

Specifically, the fuzzy system 30 is used to output an enhancement weight according to the inputted saturation component, value component and detail information or saturation component, intensity component, and detail information. The fuzzy system 30 comprises: a membership function for the saturation component, a membership function for the value or intensity component, a membership function for the detail information, and a membership function for the enhancement weight, and rule base of the fuzzy system.

Specifically, optionally, in some embodiments of the present invention, the membership function for the saturation component, the membership function for the value or intensity component, the membership function for the detail information, and the membership function for the enhancement weight are shown in FIG. 3, FIG. 4, FIG. 5, and FIG. 6, respectively. The rule base of the fuzzy system is shown in Table 1. As shown in Table 1, when the saturation is low (saturation is mf21), the enhancement weight is low (mf41) or lower (mf42) regardless of whether the detail information is transformed or not; that is, when the saturation is low, the saturation enhancement intensity is very low to avoid the hue uncertainty, and when the saturation is medium or high (mf22 or mf23), the enhancement weight will decrease as the detail information increases; that is, when the saturation is moderate or high, to reduce the loss of detail information, the more detailed information is, the lower the saturation enhancement intensity will be.

Specifically, the enhancement unit 40 is configured to enhance the saturation component according to the enhancement weight and a preset enhancement function to obtain an enhanced saturation component.

Optionally, in some embodiments of the present invention, the preset enhancement function is:

$$fS = S^R;$$

wherein S being original saturation component of the input image, fS being enhanced saturation component of the input image, R=R1×FuzzyWeight, R1 being a preset enhancement index, FuzzyWeight being an enhancement weight, R1<0.

Optionally, the preset enhancement function is:

$$fS = \text{FuzzyWeight} \times fS1 + (1 - \text{FuzzyWeight}) fS2;$$

wherein fS is the enhanced saturation component of the input image, FuzzyWeight is an enhancement weight, fS1 is a first saturation component obtained from a preset first function and original saturation component of the input image, fS2 is a second saturation component obtained from a preset second function and the original saturation component of the input image, fS1>fS2; the preset first function is a segment transformation function, and the preset second function is a linear mapping function.

Optionally, as shown in FIG. 7, the preset first function is a segment transformation function, the preset second function is a linear mapping function, the preset first function is shown by the solid line in the FIG. 7, and the preset second function is shown by the dotted line in FIG. 7. The preset first function comprises the first transformation segment 100 and the second transformation segment 200. Under the same original saturation, the first saturation component is always greater than the second saturation component. The larger the enhancement weight is, the closer the enhanced saturation component is to the first saturation component; that is, the larger the enhancement weight is, the greater the enhancement intensity is. Accordingly, the smaller the enhancement weight is, the closer the enhanced saturation component is to the second saturation component. In other words, the smaller the enhancement weight is, the smaller the enhancement intensity is.

Specifically, the recovery unit 50 is configured to convert the hue component, the enhanced saturation component and the value component or the hue component, the enhanced saturation component, and the intensity component back to the RGB color space to obtain a saturation-enhanced image. Specifically, the conversion of the hue component, enhanced saturation component and value component or hue component, enhanced saturation component and intensity component back to the RGB color space is completed by adopting the known conversion technique, which will not be described here.

In summary, the present invention provides a saturation enhancement method based on fuzzy control, and the saturation enhancement method based on fuzzy control utilizes a fuzzy system to output an enhancement weight according to the saturation component, value component and detail information or saturation component, intensity component, and detail information of an input image, and feeds back the enhancement weight to the enhancement function to change the saturation intensity of the saturation component, so that the color uncertainty caused by saturation enhancement can be avoided, and the loss of detail information in saturation enhancement can be reduced. The present invention also provides a saturation enhancement device based on fuzzy control, which can avoid the color uncertainty caused by saturation enhancement and reduce the loss of detail information in saturation enhancement.

It should be noted that in the present disclosure the terms, such as, first, second are only for distinguishing an entity or operation from another entity or operation, and does not imply any specific relation or order between the entities or operations. Also, the terms "comprises", "include", and other similar variations, do not exclude the inclusion of other non-listed elements. Without further restrictions, the expression "comprises a . . . " does not exclude other identical elements from presence besides the listed elements.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claim of the present invention.

What is claimed is:

1. A saturation enhancement method based on fuzzy control, which comprises the following steps of:
    Step S1: converting an input image from RGB color space to HSV color space consisting of hue component, saturation component and value component or HSI color space consisting of hue component, saturation component and intensity component;
    Step S2: performing edge detection on the input image based on the saturation component to obtain detail information of the input image;
    Step S3: providing a fuzzy system to input the saturation component, value component and detail information or saturation component, intensity component and detail information of the input image into the fuzzy system;
    Step S4: the fuzzy system outputting an enhancement weight according to the inputted saturation component, value component and detail information or saturation component, intensity component, and detail information;
    Step S5: according to the enhancement weight and a preset enhancement function, enhancing the saturation component to obtain an enhanced saturation component;
    Step S6: converting the hue component, the enhanced saturation component, and the value component or hue component, the enhanced saturation component, and the intensity component back to the RGB color space to obtain a saturation-enhanced image.

2. The saturation enhancement method based on fuzzy control as claimed in claim 1, wherein in step S3, the step of providing a fuzzy system specifically comprises:
    setting a membership function for the saturation component, a membership function for the value or intensity component, a membership function for the detail information, and a membership function for the enhancement weight in the fuzzy system; and defining rule base of the fuzzy system.

3. The saturation enhancement method based on fuzzy control as claimed in claim 1, wherein in step S2, the input image is edge-detected and normalized through a Sobel template to obtain detail information of the input image.

4. The saturation enhancement method based on fuzzy control as claimed in claim 1, wherein the preset enhancement function in step S5 is:

$$fS=S^R;$$

wherein S is original saturation component of the input image, fS is enhanced saturation component of the input image, R=R1×FuzzyWeight, R1 is a preset enhancement index, FuzzyWeight is an enhancement weight, R1<0.

5. The saturation enhancement method based on fuzzy control as claimed in claim 1, wherein the preset enhancement function in step S5 is:

$$fS=\text{FuzzyWeight} \times fS1+(1-\text{FuzzyWeight})fS2;$$

wherein fS is the enhanced saturation component of the input image, FuzzyWeight is an enhancement weight, fS1 is a first saturation component obtained from a preset first function and original saturation component of the input image, fS2 is a second saturation component obtained from a preset second function and the original saturation component of the input image, fS1>fS2; the preset first function is a segment transformation function, and the preset second function is a linear mapping function.

6. A saturation enhancement device based on fuzzy control, which comprises: a transformation unit, a detection unit connected with the transformation unit, a fuzzy system connected with the transformation unit and the detection unit, an enhancement unit connected with the transformation unit and the fuzzy system, and a recovery unit connected with the enhancement unit and the transformation unit;
    wherein the transform unit being configured to convert an input image from RGB color space to an HSV color space consisting of a hue component, a saturation component, and a value component or an HSI color space consisting of a hue component, a saturation component, and an intensity component;
    the detection unit being configured to perform edge detection on the input image according to the saturation component to obtain detail information of the input image;
    the fuzzy system being used to output an enhancement weight according to the inputted saturation component, value component and detail information or saturation component, intensity component, and detail information;

the enhancement unit being configured to enhance the saturation component according to the enhancement weight and a preset enhancement function to obtain an enhanced saturation component;

the recovery unit being configured to convert the hue component, the enhanced saturation component and the value component or the hue component, the enhanced saturation component, and the intensity component back to the RGB color space to obtain a saturation-enhanced image.

7. The saturation enhancement device based on fuzzy control as claimed in claim 6, wherein the fuzzy system comprises: a membership function for the saturation component, a membership function for the value or intensity component, a membership function for the detail information, a membership function for the enhancement weight and rule base of the fuzzy system.

8. The saturation enhancement device based on fuzzy control as claimed in claim 6, wherein the detection unit uses a Sobel template to perform edge detection and normalization on the input image to obtain the detail information of the input image.

9. The saturation enhancement device based on fuzzy control as claimed in claim 6, wherein the preset enhancement function is:

$$fS=S^R;$$

wherein S is original saturation component of the input image, fS is enhanced saturation component of the input image, $R=R1 \times FuzzyWeight$, R1 is a preset enhancement index, FuzzyWeight is an enhancement weight, R1<0.

10. The saturation enhancement device based on fuzzy control as claimed in claim 6, wherein the preset enhancement function is:

$$fS = FuzzyWeight \times fS1 + (1-FuzzyWeight)fS2;$$

wherein fS is the enhanced saturation component of the input image, FuzzyWeight is an enhancement weight, fS1 is a first saturation component obtained from a preset first function and original saturation component of the input image, fS2 is a second saturation component obtained from a preset second function and the original saturation component of the input image, fS1>fS2; the preset first function is a segment transformation function, and the preset second function is a linear mapping function.

11. A saturation enhancement method based on fuzzy control, which comprises the following steps of:

Step S1: converting an input image from RGB color space to HSV color space consisting of hue component, saturation component and value component or HSI color space consisting of hue component, saturation component and intensity component;

Step S2: performing edge detection on the input image based on the saturation component to obtain detail information of the input image;

Step S3: providing a fuzzy system to input the saturation component, value component and detail information or saturation component, intensity component and detail information of the input image into the fuzzy system;

Step S4: the fuzzy system outputting an enhancement weight according to the inputted saturation component, value component and detail information or saturation component, intensity component, and detail information;

Step S5: according to the enhancement weight and a preset enhancement function, enhancing the saturation component to obtain an enhanced saturation component;

Step S6: converting the hue component, the enhanced saturation component, and the value component or hue component, the enhanced saturation component, and the intensity component back to the RGB color space to obtain a saturation-enhanced image;

wherein in step S3, the step of providing a fuzzy system specifically comprising:

setting a membership function for the saturation component, a membership function for the value or intensity component, a membership function for the detail information, and a membership function for the enhancement weight in the fuzzy system; and defining rule base of the fuzzy system;

wherein in step S2, the input image being edge-detected and normalized through a Sobel template to obtain detail information of the input image;

wherein the preset enhancement function in step S5 is:

$$fS=S^R;$$

wherein S is original saturation component of the input image, fS is enhanced saturation component of the input image, $R=R1 \times FuzzyWeight$, R1 is a preset enhancement index, FuzzyWeight is an enhancement weight, R1<0.

* * * * *